P. J. SMITH.

Assignor to SELF, J. E. C. SMITH & W. B. SMITH.

TOOL FOR PACKING STUFFING BOXES.

No. 11,035. Reissued Oct. 15, 1889.

Witnesses:

J. Thomson Cross

Wm. C. Rouzee

Inventor:

Peter J. Smith per Henry Orth

Atty.

UNITED STATES PATENT OFFICE.

PETER J. SMITH, OF PHILADELPHIA, PENNSYLVANIA, ASSIGNOR TO HIMSELF AND JOSEPH E. C. SMITH, OF SAME PLACE, AND WILLIAM B. SMITH, OF WASHINGTON, DISTRICT OF COLUMBIA.

TOOL FOR PACKING STUFFING-BOXES.

SPECIFICATION forming part of Reissued Letters Patent No. 11,035, dated October 15, 1889.

Original No. 387,458, dated August 7, 1888. Application for reissue filed February 27, 1889. Serial No. 301,593.

*To all whom it may concern:*

Be it known that I, PETER J. SMITH, a citizen of the United States, residing at Philadelphia, in the county of Philadelphia and State of Pennsylvania, have invented certain new and useful Improvements in a Tool for Packing Stuffing-Boxes and for Packing Heater, Condenser, and other Tubes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
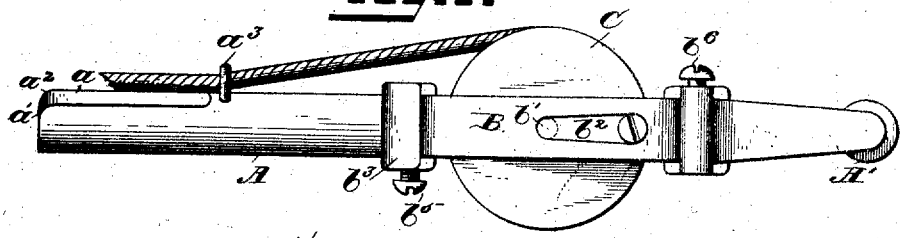
Figure 2:
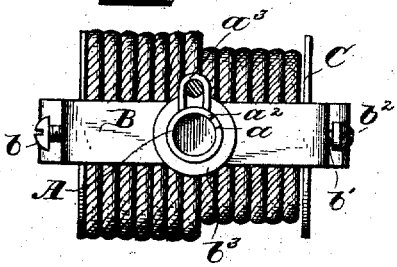
Figure 3:
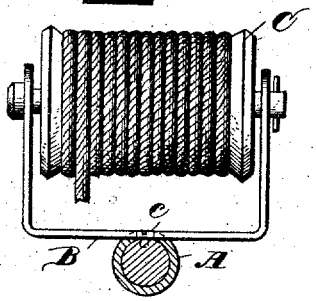
Figure 4:
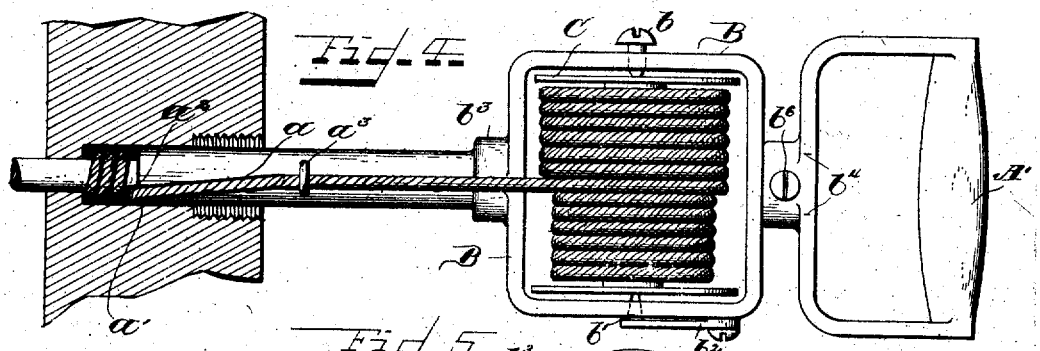
Figure 5:
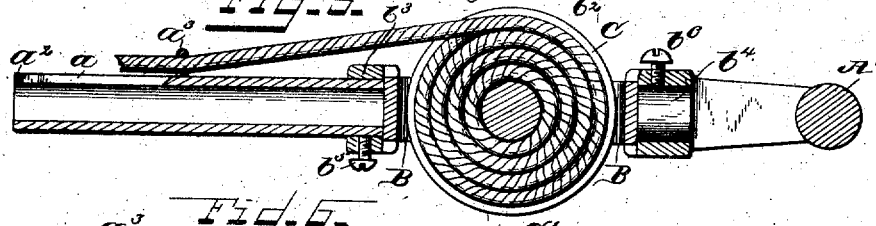

Referring to the drawings, Figure 1 is a side elevation; Fig. 2, an end elevation. Fig. 3 is a like view, partly in section; Fig. 4, a top plan view, and Figs. 5 and 6 longitudinal vertical sections, of a tool embodying my invention.

The invention relates to a tool adapted for use in packing deep stuffing-boxes—such as the stuffing-boxes of globe-valves—but more especially adapted for packing heater and condenser tubes; and it has for its object to provide means whereby such may be conveniently and effectually packed, and whereby the packing may be cut out when worn and repacked without trouble.

The invention consists, essentially, in a tubular packer-rod adapted to fit upon the part to be packed or around which the packing is to be laid, said packer being provided with a guide slot or groove to guide the packing-strand and wind it around the said part when the tool is revolved, substantially as hereinafter fully described, and as set forth in the claims.

The invention further consists in providing the tool with a cutter-lip for the purpose of cutting out worn packing, substantially as hereinafter fully described, and as set forth in the claims.

The invention further consists in the combination, with the tool, of a revoluble carrier for the packing and of a friction-brake to check and regulate the rotation of the carrier, substantially as hereinafter described, and as set forth in the claims.

The difficulties encountered in packing deep stuffing-boxes or in packing the ends of condenser or heater tubes are well known to those conversant with this branch of mechanics. These difficulties are entirely overcome by my invention, in that the packing may be introduced into the stuffing-box or into the socket or bearing for heater and condenser or other packed tubes, wound around the same in a uniform manner, and packed to any desired degree. In a similar manner old packing may be readily cut out for the purpose of repacking.

As shown in the drawings, the tool consists of a tubular packer-rod A, adapted to fit on a spindle or over the end of a tube around which the packing is to be laid. The packer-rod A is provided with a handle A′, of any suitable or desired form, for conveniently revolving said rod; and such handle may form a separate or an integral part of the rod, as may be desired, and may be provided with a flattened outer face $a^4$, Fig. 6, so that a hammer or mallet may be brought into use for condensing the packing.

The tubular portion of the packer-rod is slotted, as shown at $a$, which slot may be parallel to the axis of the rod, the outer end of said slot curving laterally, as shown at $a'$, or said slot may be formed on a spiral line extending from one end to the other of the tubular portion. At that end of the slot which lies in the direction in which the tool is revolved in winding the packing—that is to say, at the left end of the slot, Figs. 2, 5, and 6—is formed a cutting-lip $a^2$.

Instead of slotting the rod along the tubular portion thereof, said rod may be grooved for the reception of the packing-strand, said groove terminating in a slot at the end of the rod, on one side of which is formed the cutting-lip $a^2$.

B indicates a spool-holder, of a rectangular form, provided with bearings $b^3$ $b^4$, for the reception of the packer-rod A and the handle A′, respectively, said parts being detachably connected with the spool-holder by means of set-screws $b^5$ $b^6$.

One journal for the spool C consists of a cone-screw $b$, while the other journal consists of a cone-pin $b'$, projecting from a spring-plate $b^2$, secured to the spool-holder B. The stress of the spring on the journal $b'$ and the pressure of the latter in its bearings in the spool serve to retard or check the rotation of the spool, so that the packing will be fed as it is wound around the part to be packed to prevent choking or obstructing the operation of the tool. As shown in Fig. 4, these spool-journals are secured in the opposite sides of the spool-holder, so that the spring-carried journal $b'$ pressing in its bearing in one end of the spool thereby increases the friction of the latter on both its journals and forms a friction-brake to the spool to give the necessary tension to the packing as it is drawn from the spool by the winding action of the packer-rod.

To guide the packing properly into the slot or groove $a$, I provide a guide-eye $a^3$ at the rear end of such slot or groove, as shown. The guide-eye performs here an important function, in that it properly guides the packing-strand to the slot and prevents the tendency of said packing to wind around the packer-rod instead of on the part to be packed.

Figure 6:
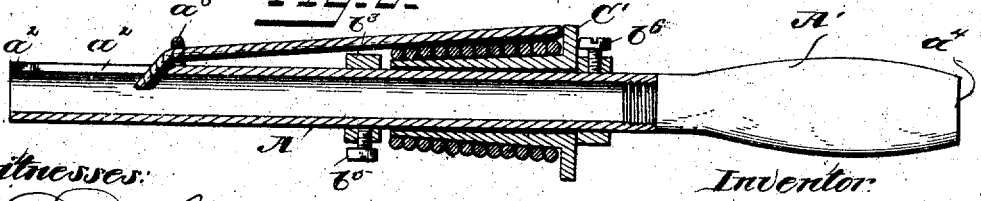

The handle A′ may be connected directly with or form an integral part of the packer-rod, and the spool-holder or frame may be secured to the packer-rod by means of a set screw or screws $c$, the packer-rod being flattened for the reception of the base-plate of the spool-holder, as shown in Fig. 3, A bobbin C′ may be used instead of the spool C and spool-holder B, and mounted on the packer-rod itself, as shown in Fig. 6; or either of these devices may be dispensed with.

The operation of the tool is as follows: The end of the packing-strand being laid into the slot or groove $a$ of the packing-rod and then around the part to be packed, said rod is pushed home and the tool revolved from left to right, the cutting-lip $a^2$ serving as an abutment for the packing-strand, while the end of the slot $a$ serves to guide said strand around the part to be packed. When several convolutions have been wound on the part to be packed, these are then condensed by using the tool as a rammer, to assist which a hammer or mallet may be used. A further length of packing is then wound on and condensed, and so on until the operation is completed, when the end of the packing-strand is cut off.

To remove an old packing, the tool is revolved in a reverse direction, or from right to left, so as to cause the cutting-lip to bite into the packing, the tool performing the function of a hollow or tubular auger, unwinding the packing, which may be drawn out through the slot $a$ as it is unwound or cut.

Having now described my invention, what I claim is—

1. The herein-described packing-tool, consisting, essentially, of a tubular packer-rod adapted to fit upon the part to be packed and provided with a longitudinal guide-slot extending along the tubular portion of the rod for the reception and guidance of the packing-strand, whereby when said rod is placed upon the part to be packed and revolved said strand will be wound around such part, substantially as and for the purposes specified.

2. The herein-described packing-tool, consisting, essentially, of a tubular packer-rod adapted to fit upon the part to be packed and provided with a longitudinal guide-slot, and a guide-eye arranged in proximity to the closed end of said slot, substantially as and for the purposes specified.

3. The herein-described packing-tool, consisting of a tubular and longitudinally-slotted packer-rod adapted to fit onto the part to be packed, and in combination therewith of a friction-brake to maintain the packing-strand at the proper tension, substantially as and for the purposes specified.

4. The herein-described packing-tool, consisting, essentially, of a tubular longitudinally-slotted packer-rod adapted to fit upon the part to be packed, a friction-brake for the packing-strand, and a guide for said strand interposed between the friction-brake and slot, substantially as and for the purposes specified.

5. The herein-described packing-tool, consisting of a tubular packer-rod adapted to fit upon the part to be packed and provided with a longitudinal slot extending along the tubular portion of the rod for the reception and guidance of the packing-strand, in combination with a revoluble carrier for the packing, substantially as and for the purposes specified.

6. The herein-described packing-tool, consisting of a tubular packer-rod adapted to fit upon the part to be packed and provided with a longitudinal slot formed in the tubular portion thereof, said slot curving from right to left at the open end of said tubular portion of the rod, and a guide-eye $a^3$, arranged in proximity to the closed end of said slot, substantially as and for the purposes specified.

7. The herein-described packing-tool, consisting of a tubular packer-rod adapted to fit upon the part to be packed and provided with a longitudinal slot formed in the tubular portion thereof, one of the walls of said slot having its outer end formed into or provided with a cutting-lip, whereby the rod is made to perform the function of an auger when revolved in a given direction, substantially as and for the purposes specified.

8. The herein-described packing-tool, consisting of a tubular packer-rod provided with a guide-slot for the packing-strand, in combination with a revoluble packing-carrier, and a friction-brake for said carrier, substantially as and for the purposes specified.

9. A tool of the class described, comprising a tubular packer-rod adapted to fit upon the part to be packed and provided with a guide groove or slot for the reception and guidance of the packing, a handle for said rod, and a revoluble carrier for the packing, said parts being detachably connected together, substantially as and for the purposes specified.

10. The herein-described packing-tool, consisting of a tubular packer-rod A, provided with a slot $a$ and a cutting-lip $a^2$, in combination with the spool B and the spring-plate $b^2$, provided with the cone-pin $b'$, that constitutes one of the journals for the spool and operates as a friction-brake, substantially as and for the purposes specified.

In testimony whereof I affix my signature in presence of two witnesses.

PETER J. SMITH.

Witnesses:

JOS. E. C. SMITH,

WM. PRINCE.